United States Patent Office 3,318,846
Patented May 9, 1967

3,318,846
RESINOUS PRODUCTS FROM UNSATURATED HETEROCYCLIC COMPOUNDS AND METHOD FOR PREPARING THE SAME
Curtis W. Smith, Berkeley, and Thomas F. Mika, Orinda, Calif., assignors to Shell Oil Company, New York, N.Y., a corporation of Delaware
No Drawing. Filed May 10, 1963, Ser. No. 279,619
12 Claims. (Cl. 260—47)

This invention relates to new synthetic resinous products and their preparation. More particularly, the invention relates to a new class of resinous products prepared from compounds having a plurality of heterocyclic rings containing ethylenic groups and to a method for their preparation.

Specifically, the invention provides a new and particularly useful class of resinous products comprising the product of reaction of (1) a compound containing a plurality of groups comprising a cyclic structure containing an ethylenic group adjacent to a hetero atom, such as, for example, 3,4-dihydro-1,2-pyran-2-methyl 3,4-dihydro-1,2-pyran-2-carboxylate, and (2) certain materials possessing a plurality of active hydrogen and preferably polyhydroxy-substituted compounds and partial derivatives thereof as described hereinafter.

As a special embodiment, the invention provides resinous products particularly useful for preparing surface coatings for metals and the like, which comprises the reaction products of the above-described compounds containing a plurality of groups having a cyclic structure containing the ethylenic group adjacent to a hetero atom, and a polymethylol-substituted compound, and particularly a polymethylol-substituted benzene.

The invention further provides a process for preparing the above-described new and valuable resinous products which comprises reacting the components in the presence of an acidic catalyst, such as, for example, phosphoric acid.

It is an object of the invention to provide a new and particularly useful class of resinous products from poly-unsaturated heterocyclic compounds. It is a further object to provide a new class of resinous products from unsaturated heterocyclic compounds and compounds possessing active hydrogen atoms which are particularly useful and valuable in industry. It is a further object to provide new resinous products from unsaturated heterocyclic compounds which are particularly useful for the preparation of surface coatings. It is a further object to provide new resinous products from unsaturated heterocyclic compounds which are useful in formation of laminates and adhesives. It is a further object to provide new resinous products useful for making castings and moldings. It is a further object to provide a new process for preparing resinous products from unsaturated heterocyclic compounds. Other objects and advantages of the invention will be apparent from the following detailed description thereof.

It has now been discovered that these and other objects may be accomplished by the new resinous products of the invention comprising the reaction products of (1) a compound containing a plurality of groups comprising a cyclic structure containing an ethylenic group adjacent to a heteroatom, such as, for example, 3,4-dihydro-1,2-pyran-2-methyl 3,4-dihydro-1,2-pyran-2-carboxylate, with (2) certain compounds possessing active hydrogen atoms and preferably polyhydroxy compounds as described hereinafter, in the presence of an acid catalyst. The resinous products produced by this method possess many unexpected beneficial properties which make them valuable in industrial applications. The products prepared from the polymethylol compounds, for example, are particularly useful for preparing coatings for metal as the films are resistant to solvents, water, acids and alkali and have excellent flexibility. The products are also useful in the formation of castings, moldings and the like and in the formation of adhesives and glues.

The heterocyclic compounds used in preparing the new compositions of the invention comprise those compound possessing a plurality of cyclic structures containing an ethylenic group adjacent to a hetero atom. By hetero atom is means a polyvalent atom other than carbon, such as, for example, oxygen, nitrogen, sulfur, phosphorous, arsenic, antimony, tin, lead, silicon and the like. Cyclic groups which contain both the hetero atom and the ethylenic group include, among others, the dihydropyran, tetrahydropyridine, thiophene, pyrrole, furan and the like rings and their substituted derivatives, such as, for example, their halogenated, alkylated, alkoxy-substiuted derivatives and the like.

The group joining the above-described heterocyclic rings may be of any type of polyvalent connecting radical. Examples of these radicals include the simple inorganic or organic radicals such as bivalent hydrocarbon radicals or hydrocarbon radicals containing other elements such as oxygen, nitrogen, sulfur, phosphorous and the like, in the said radicals. The radicals may also be substituted with halogen atoms, ether, ester, mercaptan, urethane, amide, imide and the like radicals. The polyvalent connecting radicals may also be of a polymeric nature.

A preferred group of the above-described compounds may be exemplified by the following structural formula:

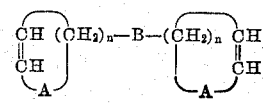

wherein A is a member of the group comprising oxygen, sulfur, nitrogen, phosphorous, arsenic, antimony, tin, lead, silicon and germanium, B is any organic or inorganic element or radical, n is an integer of at least 1.

A particularly preferred group of the heterocyclic compounds include those represented by the following structural formula:

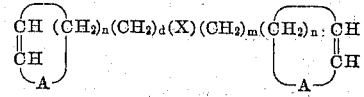

wherein A and n are as described above, d and m are 0 to 6 and X is a member of the group comprising hydrocarbon radicals, ether oxygen atom, sulfur atom, ester linkage, nitrogen atom, amide, imide, urethane linkage and the like.

Coming under special consideration, particularly because of the superior properties of the resulting cured products are the dihydropyran compounds of the formula:

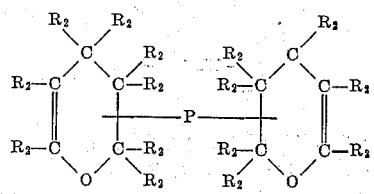

wherein $R_2$ is hydrogen, alkyl, alkoxy or halogen, P is a hydrocarbon radical or substituted hydrocarbon radical, such as one containing an ether oxygen, —S—, —SO—, —SO$_2$—, —SS—, ester, amide, imide, carbamyl, epoxide, or the like.

Examples of the above-described compounds include, among others, 3,4-dihydro-1,2-pyran-2-methyl 3,4-dihydro-1,2-pyran-2-carboxylate

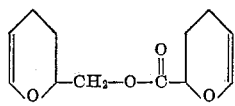

3,4-dihydro-1,2-pyran-2-methyl 2,3-dihydrothiophene-2-carboxylate

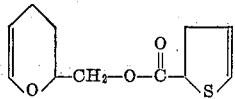

3,4-dihydro-1,2-pyran-2-methyl N-methyl-1,2,3,4-tetrahydropyridine-2-carboxylate

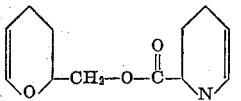

3,4-dihydro-1,2-pyran-2-methyl N-methyl-2,3-dihydropyrrole-2-carboxylate

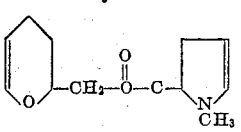

3,4-dihydro-1,2-pyran-2-methyl 2,3-dihydrofuran-2-carboxylate

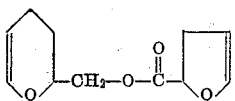

1,5-bis(3,4-dihydro-1,2-pyran-2-methoxy)pentane

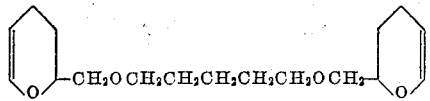

1,2,6-tris(3,4-dihydro-1,2-pyran-2-methoxy)hexane

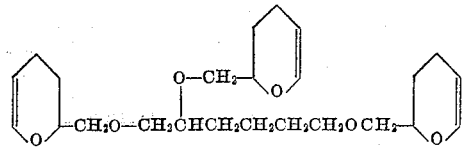

1,5-bis(3,4-dihydro-1,2-pyran-2-methylmercapto)pentane

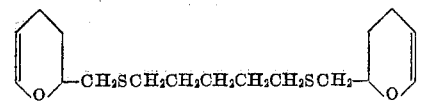

N-methyl-2,3-dihydropyrrole-2-methyl N-methyl-1,2,3,4-tetrahydropyridine-2-carboxylate

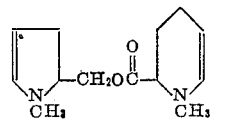

3,4-dihydro-2,5-dioctyl-1,2-pyran-2-butyl 3,4-dihydro-1,2-pyran-2-carboxylate

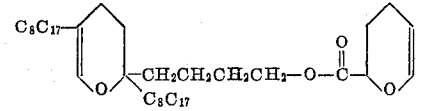

2,3-dihydrofuran-2-butyl-2-furoate

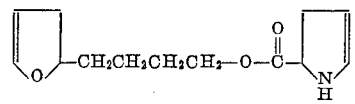

2,3-dihydrofuran-2-octyl 2,3-dihydrofuran-2-carboxylate

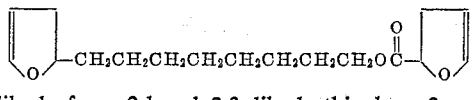

2,3-dihydrofuran-2-hexyl 2,3-dihydrothiophene-2-carboxylate

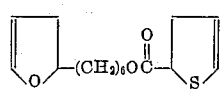

Other examples include compounds of the formulae:

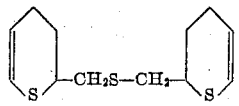

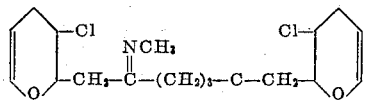

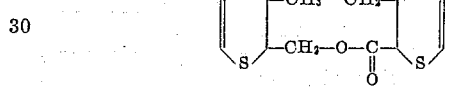

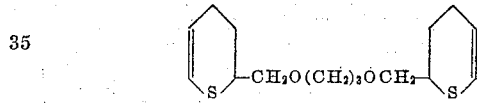

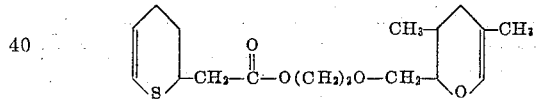

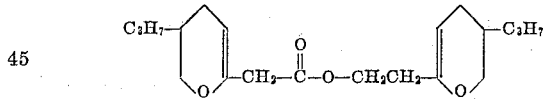

Other examples include compounds having more than 2 heterocyclic rings, such as

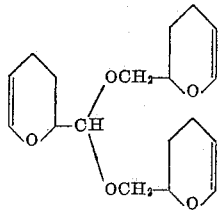

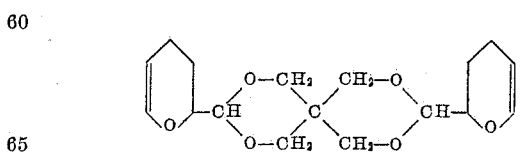

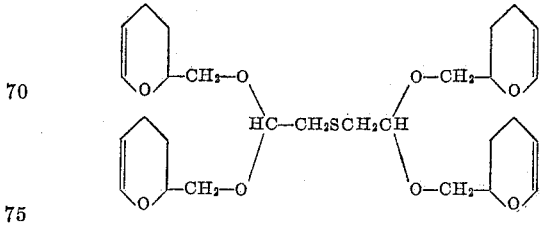

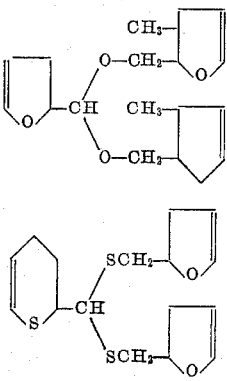

A valuable group include those of the formula

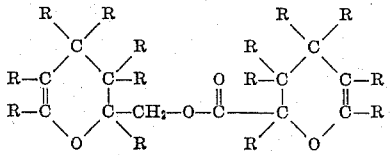

in which each R represents hydrogen or a hydrocarbon radical (and preferably an alkyl group). Examples of these compounds include, among others, 3,4-dihydro-1,2-pyran-2-methyl 3,4-dihydropyran-2-carboxylate,
4-butyl-3,4-dihydro-1,2-pyran-2-methyl 3,4-dihydropyran-2-carboxylate,
3,4-diethyl-3,4-dihydro-1,2-pyran-2-methyl 3,4-dihydropyran-2-carboxylate,
3,4-diisopropyl-3,4-dihydro-1,2-pyran-2-methyl 3,4-diisopropyl-3,4-dihydropyran-2-carboxylate,
4-hexyl-3,4-dihydro-1,2-pyran-2-methyl 3,4-diisopropyl-3,4-dihydropyran-2-carboxylate,
4,5-di-tert-butyl-3,4-dihydropyran-2-methyl 4-hexyl-3,4-dihydropyran-2-carboxylate,
4,6-dioctyl-3,4-dihydropyran-2-methyl 4-octyl-3,4-dihydropyran-2-carboxylate,
2,5-didodecyl-3,4-dihydropyran-2-methyl 4-octyl-3,4-dihydropyran-2-carboxylate.

The above-described compounds can be prepared by a variety of different methods. The esters of the heterocyclic acids and heterocyclic alcohols can, for example, be prepared by reacting a salt of the acid with a halide corresponding to the heterocyclic alcohol. The ethers can be obtained by reacting the alcohol with a halide corresponding to the heterocyclic acid in the presence of a suitable catalyst. The amides may be prepared by reacting the heterocyclic amine with the desired heterocyclic acid in the presence of conventional catalysts. Alternatively the esters may be prepared by reacting an aldehyde, such as the 3,4-dihydro-1,2-pyran 2-carboxaldehyde with the catalyst, such as aluminum isopropoxide, so as to effect a Tishchenko reaction and formation of an ester group between two molecules of the aldehyde. This latter method is described in U.S. 2,537,921.

The other component to be used in making the compositions of the present invention comprise the organic compounds possessing an active hydrogen atom. This includes, among others, polyhydroxy compounds, polymercaptans, polycarboxylic acids, polyamides, polyurethanes, and the like, and mixtures thereof. Preferred compounds include the polymercaptans, such as, for example, mercapto-substituted hydrocarbons, esters, ethers, urethanes, sulfides and the like, such as glycerol trithioglycolate, pentaerythritol tetrathioglycolate, 1,2,6-hexanetriol trithioglycolate, glycerol trithiolacetate, 1,2,6-hexanetriol trithiolacetate, 1,2,4-butanetriol tri(2-mercaptobutyrate), tri(mercaptobutyl) ether of glycerol, tetra(mercaptoethyl) ether of pentaerythritol, di(mercaptoethyl) ether of 1,4-butanediol, tributyl ether of 1,4,6-trimercapto-2,5,8-octanetriol, esters of mercapto-substituted alcohols and polycarboxylic acids, such as tri(mercaptobutyl) pyromellitate, tri(mercaptobutyl) 1,2,4-butanetricarboxylate, trimercaptoethyl) trimellitate, tri(mercaptohexyl) 1,3,5-pentanetricarboxylate and mercaptoethyl esters of polyacrylic acid, mercaptobutyl esters of copolymers of methacrylic acid and styrene, 2,4,5-trimercaptotoluene-1,6-diisocyanate, 1,4-di(mercaptomethyl) 2,3,5,6-tetramethylbenzene, trimercaptophenol, bis(2,4-dimercaptobutyl) sulfide, bis(3,5-dimercaptohexyl) sulfide, bis(2,4-dimercaptobutyl) sulfone and the like, and mixtures thereof.

Other highly functional polymercaptans that can be used include other obtained by reacting polyepoxides with hydrogen sulfide. Examples of these are set out in U.S. 2,633,458. A special group of these include those obtained by reacting polyepoxides having more than 2 epoxy groups with hydrogen sulfide. Examples of such polyepoxides include, among others, glycidyl ethers of polyhydric alcohols containing at least three OH groups, such as glycerol, 1,2,6-hexanetriol, pentaerythritol.

Other examples of polymercaptans include those obtained by reacting polythiouranes with hydrogen sulfide as disclosed and claimed in copending patent application Serial No. 231,852, filed October 19, 1962, and so much of that disclosure pertinent to the preparation of these polymercaptans is incorporated herein by reference.

Other polymercaptans include those obtained by adding hydrogen sulfide to polyunsaturated compounds, such as polybutadienes, polyisoprenes and the like. This addition is preferably accomplished in the presence of catalysts, such as isopropylamine. These mercaptan subtituted polymers preferably having molecular weights varying from about 150 to about 10,000 as determined ebulliosscopically in toluene.

Another group of special polymercaptans include the mercapto-substituted heterocyclic compounds, such as tri(mercaptomethyl) trioxanes, and the like, as described and claimed in copending application Serial No. 284,370, filed May 31, 1963, and the aromatic compounds substituted with mercapto-containing side chains, such as described and claimed in copending application Serial No. 284,322, filed May 31, 1963, and so much of these disclosures pertinent to the preparation of these new polymercaptans is incorporated herein by reference.

Especially preferred polymercaptans to be employed in the process of the invention include the esters of the polyhydric alcohols and mercapto-substituted mono- and polycarboxylic acids, the esters of the mercapto-substituted alcohols and the polycarboxylic acids, the adducts of hydrogen sulfide and polyepoxides, the adducts of hydrogen sulfide and polythiuranes, the mercapto-substituted heterocyclic compounds and the aromatic compound substituted with mercapto-substituted side chains. These special polymercaptans preferably contain no more than 25 carbon atoms.

Other examples include the polycarboxylic acids, such as the aliphatic, cycloaliphatic, aromatic or heterocyclic acids which may be saturated or unsaturated. Examples include, among others, malonic acid, succinic acid, phthalic acid, isophthalic acid, oxalic acid, glutaric acid, adipic acid, 1,2,4-butanetricarboxylic acid, terephthalic acid, diphenyl-1,1'-dicarboxylic acid, pyromellitic acid, trimellitic acid, tetrahydrophthalic acid, and partial esters thereof.

Amides include those possessing at least two amide active hydrogen, such as acetamide, succinamide, polyamides from polycarboxylic acids and polyamines, such as any of the above-described polycarboxylic acids and aliphatic, cycloaliphatic and aromatic amines, such as diethylene triamine, ethylene diamine, 1,4-diaminobenzene, 1,4-diaminocyclohexane and the like, and mixtures thereof.

Particularly preferred compounds to be used include the organic compounds possessing a plurality of OH groups. Preferred members include the polyhydroxy-substituted compounds or partial derivatives thereof: polyhydric aliphatic alcohols, polyhydric aromatic alcohol partial esters, polyhydric aliphatic alcohol partial ethers, polyhydric aromatic alcohol partial ethers, polyhydric aliphatic alcohol partial ether-esters, and polyhydric aromatic alcohol partial ether-esters.

The polyhydric aliphatic alcohols may be exemplified by glycol, glycerol, 2,4-butanediol, 2,4,6-heptanetriol, 2,4-hexanedienediol-1,6, 1,5 - cyclopentanediol, 1,2,5 - cyclohexanetriol, and the like. The polyhydric aromatic alcohols may be exemplified by pyrocatechol, resorcinol, phloroglucinol, 1,3-naphthalenediol 1,4,5,8-naphthalenetetrol, and the like.

The polyhydric aliphatic alcohol partial esters may be exemplified by glycol monobutyrate, glycerol monostearate, glycerol monohexanoate, glycerol monophthalate, 2,4-butanediol monostearate, 1,5-cyclopentanediol monopalmitate, 1,2,5-cyclohexanetriol diacetate, glycerol monolaurate, glycerol monoacetate, 2,4,6-heptanetriol dioctanoate, and the like. The polyhydric aromatic alcohol partial esters may be exemplified by resorcinol monoacetate, phloroglucinol monooleate, pyrogallol dihexanoate, 1,3-naphthalenediol monooctanoate, 1,4-naphthalenediol monocaproate, and the like.

The polyhydric aliphatic alcohol partial ethers may be exemplified by glycol monopentyl ether, glycerol monoethyl ether, glycerol monophenyl ether, glycerol monooctyl ether, 2,4-butanediol monobutyl ether, 1,5-cyclopentanediol monodecyl ether, 1,2-cyclohexanetriol monoallyl ether, 2,4,6-heptanetriol diethallyl ether, glycerol monobutyl ether and the like. The polyhydric aromatic alcohol partial ethers may be exemplified by resorcinol monophenyl ether, phloroglucinol monohexyl ether, pyrogallol monoallyl ether, 1,4,5-naphthalenetriol monobutyl ether, 1,3-naphthalenetriol monobutadienyl ether, 1,4,5-naphthalenetriol dibutyl ether, 1,4-naphthalenediol monomethyl ether, and the like.

The polyhydric aliphatic alcohol partial ether esters may be exemplified by glycerol monobutyl ether monostearate, glycerol monohexyl ether monocaproate, hexanetriol monooctyl ether monoacetate, octanetriol monomethyl ether monopalmitate, cyclohexanetriol monodecyl ether monoacetate, and the like. The polyhydric aromatic alcohol partial ether esters may be exemplified by phloroglucinol monohexyl ether monostearate, pyrogallol monoallyl ether monoacetate, 1,4,5-naphthalenetriol monooctyl ether monobutyrate, and the like.

Particularly preferred hydroxy-containing compounds of the above groups to be used in the process of the invention are the organic hydroxy-containing compounds of the group consisting of the polyhydric saturated aliphatic alcohols containing from 1 to 10 carbon atoms, the polyhydric, mononuclear aromatic alcohols containing from 6 to 10 carbon atoms, the polyhydric alcohol partial esters of the polyhydric saturated aliphatic alcohols containing from 2 to 10 carbon atoms and open-chain monocarboxylic acids, containing from 1 to 18 carbon atoms, the polyhydric alcohol partial esters of the polyhydric, mononuclear aromatic alcohols containing from 6 to 10 carbon atoms and open chain monocarboxylic acids containing from 1 to 18 carbon atoms, the polyhydric alcohol partial ethers of the polyhydric saturated aliphatic alcohols containing from 2 to 10 carbon atoms and monohydric saturated alcohols containing from 1 to 10 carbon atoms, and the polyhydric alcohol partial ethers of the polyhydric, mononuclear aromatic alcohols containing from 6 to 10 carbon atoms and monohydric saturated alcohols containing from 1 to 10 carbon atoms.

Examples of this particularly preferred group of hydroxy-containing compounds to be used in the process of the invention are glycerol 2,4-butanediol, resorcinol, phloroglucinol, octanetriol, decanetriol, glycerol stearate, glycerol monocaproate, hexanetriol monolaurate, haptanetriol monovalerate, glycerol dipentadecanoate, glycerol monobutyl ether, glycerol monooctyl ether, hexanetriol monodecyl ether, resorcinol monostearate, phloroglucinol monolaurate, naphthalenetriol dicaproate, phloroglucinol monolaurate, naphthalenetriol dicaproate, phloroglucinol monodecyl ether, and the like.

An important species of the above-described hydroxy-containing compounds, especially when they are to be used in the production of resinous products to be used in the preparation of drying oils, are the glycerol mono- or diglycerides of drying oil acids. Examples of such glycerides are glycerol dioleate, glycerol linolenate, glycerol oleate linoenate, glycerol senecioate, glycerol dilinolenate, glycerol disorbate, glycerol dioctenoate, glycerol 2,8-decadienoate, glycerol, 5,8-eicasodienate, and glycerol pentacosadienoate.

The above-described mono- and diglycerides of glycerol may be prepared by esterifying the glycerol molecule with the appropriate quantities of the desired drying oil acids, preferably the open-chain, aliphatic acids containing from 6 to 30 carbon atoms, such as senecioic acid, sorbic acid, linoleic acid, linolenic acid, oleic acid, and the like acids. The glycerides may also be prepared by reacting glycerol with the drying oils themselves.

Also included are the polyols obtained by polymerzing unsaturated alcohols, such as allyl alcohol, methallyl alcohol, butenol and the like, and their copolymers with other unsaturated compounds, such as styrene, alpha-methylstyrene, methyl methacrylate, acrylonitrile, butadiene, isoprene, diallyl phthalate, divinylbenzene and the like.

Other polyols include those obtained by reacting alkylene oxides with compounds containing active hydrogen, such as polyols described above, polymercaptans, and the like.

Of particular interest are the polyols derived from polyepoxides, and particularly the glycidyl polyethers of polyhydric alcohols or phenols, such as described in U.S. 2,633,458, as by hydration, further reaction with active hydrogen containing compounds, such as polyamines, polycarboxylic acids and the like. Of special interest are the hydroxy-containing glycidyl polyethers of polyhydric phenols themselves such as obtained by controlling the ratio of epichlorohydrin and polyhydric phenols in the reaction processes shown in U.S. 2,633,458.

Of special interest are the alkylol-substituted aromatic compounds, and particularly the polymethylol-substituted aromatic compounds which may contain one or more aromatic rings which may be single, fuzed or joined by one or more connecting radicals. Examples of such include, among others, 2,4,6-trimethylolphenol, 2,4,6-trimethylolnaphthalene, allyl ether of 2,4,6-trimethylolphenol, butyl ether of 2,4,6-trimethylolphenol, novolac resins obtained by reacting phenol or polyhydric phenols with formaldehyde, polymethylol-substituted 2,2-bis(4-hydroxyphenyl)propane, 2,6-dimethylolphenol, 1,5-dihydroxy-2,6-dimethylolbenzene, 1 - hydroxy-4 - chloro-2,5-dimethylolbenzene, and 2,4-dimethylol-5-methoxyphenol.

In producing the novel resinous products of the invention, one or more of the above described compounds possessing the heterocyclic ring may be reacted with a single compound possessing the active hydrogen or a mixture of two or more of the two types of ingredients may be reacted together.

The quantity of the reactants to be added to the reaction mixture will vary over a considerable range depending upon the number of active hydrogen available on the reactant and upon the particular type of product desired. In general the reactants may be added so that the equivalent ratio of the compound possessing the heterocyclic ring and active hydrogen containing compound will vary from 5:1 to 1:5. An equivalent amount of the active hydrogen containing compound refers to that amount sufficient to furnish one active hydrogen for every double bond present in heterocyclic compound. Preferably the reactants are added to the reaction mixture so that the equivalent ratio of compound possessing the hetercyclic ring and active hydrogen containing compound will vary between 1:2 and 2:1. In case the final product desired is a hard surfaced resin, it is usually preferred to utilize smaller quantities of the active hydrogen containing compound, e.g., the equivalent ratio of the compound possessing the heterocyclic ring to the active hydrogen containing compound may vary from 1:1 to 2:1. The exact amount to be used in any case may best be determined, however, for each individual case.

Any acid catalyst or acid-acting catalyst may be utilized in the process of the invention. The acids may be organic or inorganic and may be monobasic or polybasic acids. Examples of the inorganic acids that may be utilized as catalysts are boric acid, sulfuric acid, hydrochloric acid, phosphoric acid, and the like. Examples of the organic acids that may be used in the reaction are acetic acid, butyric acid, p-toluenesulfonic acid, benzoic acid, oxalic acid, malonic acid, succinic acid, pimellic acid. Preferred aids to be used are the moderately strong acids, such as p-toluenesulfonic acid and oxalic acid.

The reaction may be executed in the presence or absence of solvents or diluents. In case the solvents or diluents are desired, inert chemical compounds, such as benzene, toluene, xylene, cyclohexane, ethyl ether, and the like may readily be employed.

The temperature employed during the reaction may vary over a considerable range, depending upon the type and proportion of reactants, catalyst employed, etc. In some cases the reaction will be exothermic and it will be desirable to employ some cooling means to maintain the reaction mixture at a lower temperature. The temperatures may generally vary between 0° C. to 250° C., with a preferred range being between 20° C. to 100° C. Atmospheric, subatmospheric or superatmospheric pressures may be used.

The resinous products formed by the above-described reaction may be separated from the reaction mixture by any suitable means comprising solvent extraction filtration, distillation, and the like.

The resinous products obtained from the reaction will vary from viscous liquids to semi-solids depending upon the type and proportion of reactants employed. The said products are substantially colorless and possess adhesive properties which enable them to adhere to surfaces of wood, metal, glass, and the like. They are thus ideal materials to be used in the preparation of surface coatings, laminating compositions, etc.

If the resinous products are to be utilized in their cured state they may be subjected to a final curing process while they are in the reaction mixture or the products may be separated from the mixture by the above-described methods and subsequently subjected to the curing process. The curing of the resinous material may be accomplished by the application of heat and/or light in the presence or absence of catalysts. Temperatures employed during the curing may vary from 50° C. to 200° C. or higher with preferred temperatures ranging from 60° C. to 100° C.

In those cases where the process is to be conducted in a one stage operation, i.e., when the resinous products are cured in the reaction mixture in which they are formed, the acid or acid acting catalyst present in the reaction mixture may act as a catalyst for the curing process. Other catalysts that may be employed to hasten the curing of the resinous products include sulfuric acid, benzoyl peroxide, acetyl peroxide, sodium peroxide, barium peroxide, peracetic acid, perphthalic acid, and the like. Amount of the catalyst employed will usually vary between 0.01% to 5% by weight of the material being cured, however, larger or smaller amounts may be utilized if desired.

The curing process may be carried to completion without substantial interruption or it may be stopped at any point short of completion. Incomplete curing may be used for producing products which may be further worked and eventually completely polymerized. The product may, for example, be transferred to a mold of any desired configuration and again subjected to the curing process.

The hard surfaced resins obtained from the curing process may be milled, drilled, cut and machined to produce many desired products of commerce, such as bottons, pins, handles, table coverings, etc. They may also be powered to produce molding compositions or may be dissolved in solvents to be used in the preparation of surface coatings, impregnating agents, multilayer laminates, and the like. The solvent or molten resins may also be cast into sheets, rods, tubes, thin films, filaments, fibers, etc.

The resinous products of the invention may be modified in any of a variety of ways by the use of large numbers of modifying substances. Some of these substances may be added to the mixture of the heterocyclic compound and active hydrogen containing compound prior to or during the resin-forming reaction, while others may be added prior to or during the final curing process. Such modifying agents include the conventional plasticizers, stabilizers, lubricants, dyes, pigments and fillers. Examples of such agents are asbestos, sand, clay, talc, mica, wood flour, cotton, pitch, asphalt, shellac, copal, camphor, naphthalene, anthracene, dioctyl phthalate, dibutyl phthalate, tricresyl phosphate, and the like. An important group of modifiers consists of the organic plastic substances, such as protein plastics, phenol-aldehyde condensation products, vinyl-type addition products, such as polystyrene, polyvinyl chloride, polyvinylidenechloride, polymethyl methacrylate, polymethacrylonitrile, and the like.

To illustrate the manner in which the invention may be carried out the following examples are given. It is to be understood, however, that the examples are for the purpose of illustration and they are not to be regarded as limiting the invention in any way.

To illustrate the manner in which the invention may be carried out, the following examples are given. It is to be understood, however, that the examples are for the purpose of illustration only and they are not to be regarded as limiting the invention in any way. Unless otherwise indicated, parts are parts by weight.

*Example I*

This example illustrates the preparation of a resinous reaction product from 3,4-dihydro-1,2-pyran-2-methyl-3,4,-dihydro-1,2-pyran-2-carboxylate and a polymethylol-substituted aromatic compound.

70 parts of 3,4-dihydro-1,2-pyran-2-methyl 3,4-dihydro-1,2-pyran-2-carboxylate was mixed with 30 parts of allyloxy-2,4,6-trimethylol-benzene and a solvent made up of 15 parts methyl ethyl ketone, 25 parts ethyl alcohol, 10 parts pine oil and 50 parts toluene. To this was added 15 parts of 10% phosphoric acid. This mixture was stirred and spread out as a film over tin plate. The solution dried in air to form a hard clear film which was not affected by methyl isobutyl ketone or by water.

*Example II*

This example illustrates the preparation of a resinous reaction product from 3,4-dihydro-1,2-pyran-2-methyl 3,4-dihydro-1,2-pyran-2-carboxylate and a polyhydroxy-containing glycidyl polyether of a polyhydric phenol.

70 parts of 3,4-dihydro-1,2-pyran-2-methyl 3,4-dihydro-1,2-pyran-2-carboxylate was combined with 30 parts of a polyhydroxy compound of the formula

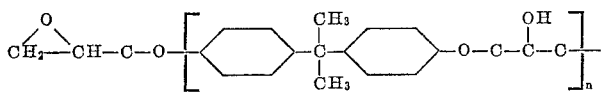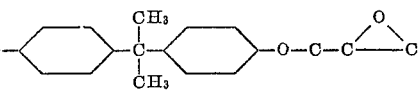

having a molecular weight of about 2900 and a solvent as in Example I. To this was added 15 parts of 10% phosphoric acid. This mixture was stirred and spread out as a film over tin plate. The solution dried in air to form a hard clear film which was not affected by methyl isobutyl ketone or by water.

*Example III*

About 16.8 parts of 3,4-dihydro-1,2-pyran-2-methyl 3,4-dihydro-1,2-pyran-2-carboxylate was combined with 6.7 parts of 1,2,6-hexanetriol and 1 part of concentrated hydrochloric acid added thereto. The resulting mixture was heated on the steam bath and in about 10 minutes the mixture had set up to a solid resin. The resin was placed in an oven at 150° C. for about 2 hours. The resin did not flow. On cooling, the product was a hard clear solid resin. The resin was not soluble in acetone or other ketones and displayed excellent adhesion to glass.

*Example IV*

This example illustrates the reaction of 3,4-dihydro-1,2-pyran-2-methyl 3,4-dihydro-1,2-pyran-2-carboxylate with the hydroxy groups of cellulose.

Filter paper discs were immersed in acrolein tetramer until thoroughly wet and then exposed to hydrochloric acid fumes. The resulting product was then placed in an oven for a short period. The resulting sheets were stiffer and slightly more brittle than before.

*Example V*

About 22.4 parts of 3,4-dihydro-1,2-pyran-2-methyl 3,4-dihydro-1,2-pyran-2-carboxylate was combined with 6 parts of glycerol and 2 parts of stannic chloride. The resulting mixture was stirred and heated to 100° C. for a short period. The mixture set up to form a hard clear resin.

*Example VI*

About 22.4 parts of 3,4-dihydro-1,2-pyran-2-methyl 3,4-dihydro-1,2-pyran-2-carboxylate was combined with a mixture of 4.5 parts of glycerol and 4.5 parts of hexanetriol. This mixture was stirred and combined with 2 parts of p-toluenesulfonic acid. The mixture was then heated in the steam bath for several hours. The resulting product was a hard clear solid resin.

*Example VII*

About 22.4 parts of 3,4-dihydro-1,2-pyran-2-methyl 3,4-dihydro-1,2-pyran-2-carboxylate was combined with 18 parts of a phenolformaldehyde resin (1.15-eq./phenolic OH/100 g.). 1 part of concentrated hydrochloric acid was added and the mixture heated to 100° C. for several hours. The resulting product on cooling was a hard solid resin.

*Example VIII*

About 22.4 parts of 3,4-dihydro-1,2-pyran-2-methyl 3,4-dihydro-1,2-pyran-2-carboxylate was combined with 5 parts of pentaerythritol and 2 parts of concentrated hydrochloric acid. The resulting mixture was heated to 100° C. for a short while. The resulting product was a hard clear solid resin.

*Example IX*

Examples I to VII are repeated with the exception that the heterocyclic compound employed is: tri(3,4-dihydroxy-1,2-pyran-2-methyl) phosphate, di(3,4-pyran-2-methyl)ether, bis(3,4 - dihydroxy-1,2-pyran-2-methoxy) silane, and tri(3,4-dihydroxy-1,2-pyran-2-methyl)1,2,4-butanetricarboxylate. Related results are obtained.

*Example X*

Examples I to V and VIII are repeated with the exception that the heterocyclic compound employed is replaced with each of the following:

N-methyl-2,3-dihydropyrrole-2-methyl N-methyl-1,2,3,4-tetrahydropyridine-2-carboxylate;

3,4-dihydro-2,1,3-pyran-2-methyl N-methyl-1,2,3,4-tetrahydropyridine-2-carboxylate;

3,4-dihydro-1,2-pyran-2-methyl 2,3-dihydrothiophene-2-carboxylate; and 3,4-dihydro-1,2-pyran-2-methyl 2,3-dihydrofuran-2-carboxylate.

Related results are obtained.

*Example XI*

An equivalent amount of a reaction product of diglycidyl ether of 2,2-bis(4-hydroxyphenyl)propane and hydrogen sulfide was reacted with an equivalent amount of 3,4-dihydro-1,2-pyran-2-methyl 3,4-dihydro-1,2-pyran-2-carboxylate in the presence of 2 parts of phosphoric acid. The mixture was stirred and heated to 50° C. In a short while the mixture set up to a hard tough resin.

*Example XII*

Example XI is repeated with the exception that the polymercaptan is replaced with a liquid polythiopolymercaptan having a mol weight of about 4000 and a structure such as $HSC_2H_4OCH_2OC_2H_4(SSC_2H_4OCH_2OC_2H_4)_nSH$ Related results are obtained.

*Example XIII*

Related results are also obtained by replacing the polymercaptan in Example XI with glycerol trithioglycolate.

*Example XIV*

Related results are also obtained by replacing the polymercaptan in Example XI with a polyamide of trimerized linoleic acid and diethylene triamine.

We claim as our invention:

1. A resinous product comprising the product of reaction in the presence of an acid catalyst of (1) a compound of the formula

wherein A is a member of the group consisting of oxygen and sulfur, X is a member of the group consisting of hydrocarbon radicals, ether oxygen atoms,

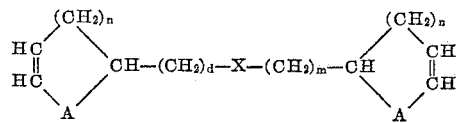

and —S— radicals, wherein $n$ is an integer of at least 1, $d$ and $m$ are integers of 0 to 6, and (2) an aliphatic or aromatic compound containing at least two —OH groups and no other reactive groups, the reaction being conducted at a temperature between 0° C. and 250° C., and compound (1) and compound (2) being combined in a chemical equivalent ratio of 5:1 to 1:5 with an equivalent amount referring to that amount needed to furnish one hydroxyl hydrogen atom for every double bond present in compound (1).

2. A resinous product comprising the product of reaction in the presence of an acid catalyst of (1) a compound of the formula

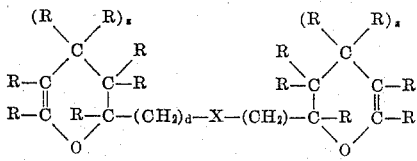

wherein R is a member of the group consisting of hydrogen and alkyl radicals, z is an integer of 0 to 1, X is a member of the group consisting of hydrocarbon radicals, ether oxygen atoms,

and —S— radicals, wherein d and m are integers of 0 to 6, and (2) a polymethylol-substituted aromatic compound possessing no other reactive group than the OH groups, the reaction being conducted at a temperature between 0° C. and 250° C., and compound (1) and compound (2) being combined in a chemical equivalent ratio of 5:1 to 1:5 with an equivalent amount referring to that amount needed to furnish one hydroxyl hydrogen atom for every double bond present in compound (1).

3. A resinous product comprising the product of reaction in the presence of an acid catalyst of (1) a compound of the formula

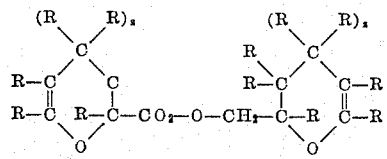

wherein R is a member of the group consisting of hydrogen and alkyl radicals, and z is an integer of 0 to 1, and (2) a polyhydric alcohol possessing no other reactive group other than the OH groups, the reaction being conducted at a temperature between 0° C. and 250° C. and compound (1) and compound (2) being combined in a chemical equivalent ratio of 5:1 to 1:5 with an equivalent amount referring to that amount needed to furnish one hydroxyl hydrogen atom for every double bond present in compound (1).

4. A resinous product comprising the product of reaction in the presence of an acid catalyst of (1) a compound of the formula

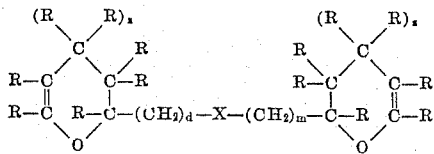

wherein R is a member of the group consisting of hydrogen and alkyl radicals, z is an integer of 0 to 1, X is a member of the group consisting of hydrocarbon radicals, ether oxygen atoms,

and —S— radicals, wherein d and m are integers of 0 to 6, and (2) an organic hydroxy-containing compound of the group consisting of polyhydroxy-substituted aliphatic hydrocarbons, polyhydroxy-substituted aromatic hydrocarbons, hydrocarbon partial ethers of polyhydroxy-substituted aliphatic and aromatic hydrocarbons, hydrocarbon-partial esters of polyhydroxy-substituted aliphatic and aromatic hydrocarbons, and partial ethers and partial esters of aliphatic and aromatic polyhydroxy substituted aliphatic and aromatic hydrocarbons, said hydroxy compounds possessing no reactive group other than the OH groups, the reaction being conducted at a temperature between 0° C. and 250° C., and compound (1) and compound (2) being combined in a chemical equivalent ratio of 5:1 to 1:5 with an equivalent amount referring to that amount needed to furnish one hydroxyl hydrogen atom for every double bond present in compound (1).

5. A resinous product of reaction in the presence of an acid catalyst of (1) 3,4-dihydro-1,2-pyran-2-methyl 3,4-dihydro-1,2 - pyran - 2 - carboxylate, and (2) a polymethylol-substituted aromatic compound possessing no other reactive group other than the methylol groups, the reaction being conducted at a temperature between 0° C. and 250° C., and compound (1) and compound (2) being combined in a chemical equivalent ratio of 5:1 to 1:5 with an equivalent amount referring to that amount needed to furnish one hydroxyl hydrogen atom for every double bond present in compound (1).

6. A resinous product of reaction in the presence of an acid catalyst of (1) bis(3,4-dihydro-1,2-pyran-2-methyl) ether and (2) an aliphatic polyhydric alcohol possessing no other reactive group other than the OH groups, the reaction being conducted at a temperature between 0° C. and 250° C., and compound (1) and compound (2) being combined in a chemical equivalent ratio of 5:1 to 1:5 with an equivalent amount referring to that amount needed to furnish one hydroxyl hydrogen atom for every double bond present in compound (1).

7. A resinous product of reaction in the presence of an acid catalyst of (1) 3,4-dihydro-1,2-pyran-2-methyl 3,4-dihydro-1,2-pyran-2-carboxylate and (2) glycerol, the reaction being conducted at a temperature between 0° C. and 250° C., and compound (1) and compound (2) being combined in a chemical equivalent ratio of 5:1 to 1:5 with an equivalent amount referring to that amount needed to furnish one hydroxyl hydrogen atom for every double bond present in compound (1).

8. A process for preparing a resinous product comprising reacting in the presence of an acid catalyst (1) a heterocyclic compound of the formula

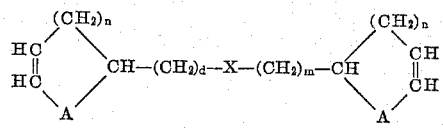

wherein A is a member of the group consisting of oxygen sulfur, X is a member of the group consisting of hydrocarbon radicals, ether oxygen atoms,

and —S— radicals, wherein n is an integer of at least 1, d and m are integers of 0 to 6, and (2) an organic compound containing at least two

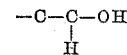

groups and no other reactive group, at a temperature between 0° C. and 250° C., compound (1) and compound (2) being combined in a chemical equivalent ratio of 5:1 to 1:5 with an equivalent amount referring to that amount needed to furnish one hydroxyl hydrogen atom for every double bond present in the heterocyclic compound.

9. A process as in claim 8 wherein the heterocyclic compound has the formula

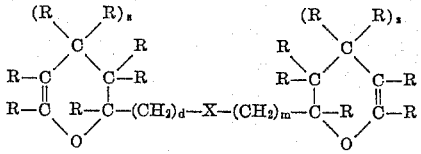

wherein R is a member of the group consisting of hydrogen and alkyl radicals, z is an integer of 0 to 1, X is a member of the group consisting of hydrocarbon radicals, ether oxygen atoms,

and —S— radicals, wherein $d$ and $m$ are integers of 0 to 6.

10. A process as in claim 8 wherein the heterocyclic compound is 3,4-dihydro-1,2-pyran-2-methyl 3,4-dihydro-1,2-pyran-2-carboxylate, and the hydroxyl compound is a polymethylol-substituted aromatic compound.

11. A process as in claim 8 wherein the heterocyclic compound is 3,4-dihydro-1,2-pyran-2-methyl 3,4-dihydro-1,2-pyran-2-carboxylate, and the hydroxyl compound is allyloxy-2,4,6-trimethylol benzene.

12. A process as in claim 8 wherein the acid catalyst is phosphoric acid.

References Cited by the Examiner

UNITED STATES PATENTS

| | | | |
|---|---|---|---|
| 2,370,572 | 2/1945 | Muskat et al. | 260—2 |
| 3,226,401 | 12/1965 | Tinsley | 260—88.3 |
| 3,242,104 | 3/1966 | Brueschweiler et al. | 260—2 |
| 3,244,647 | 4/1966 | Greenley et al. | 260—2 |
| 3,245,950 | 4/1966 | Holm | 260—47 |

LEON J. BERCOVITZ, *Primary Examiner.*

DONALD E. CZAJA, *Examiner.*

C. W. IVY, *Assistant Examiner.*